United States Patent

Inoue et al.

[11] 3,888,364
[45] June 10, 1975

[54] UNLOADER SYSTEM
[75] Inventors: Yoshio Inoue; Yasuaki Sato, both of Mihara, Japan
[73] Assignee: Mitsubishi Jukogyo Kabushiki Kaisha, Tokyo, Japan
[22] Filed: June 27, 1973
[21] Appl. No.: 374,096

[30] Foreign Application Priority Data
July 19, 1972  Japan.............................. 47-71634

[52] U.S. Cl........ 214/8.5 A; 214/8.5 F; 214/8.5 SS; 214/310
[51] Int. Cl............................................. B65g 59/02
[58] Field of Search .......... 214/38 CC, 16.4 A, 6 H, 214/622, 730, 8.5 A, 8.5 F, 8.5 SS; 108/51

[56] References Cited
UNITED STATES PATENTS
| 2,451,226 | 10/1948 | Kemp, Jr............. | 214/38 CC |
| 3,746,148 | 7/1973 | Hilger et al............ | 214/16.4 A |
| 3,767,065 | 10/1973 | Hall et al.............. | 214/38 CC |

FOREIGN PATENTS OR APPLICATIONS
1,187,448  9/1959  France............................... 214/622

Primary Examiner—Robert J. Spar
Assistant Examiner—Lawrence J. Oresky
Attorney, Agent, or Firm—Cushman, Darby & Cushman

[57]  ABSTRACT

An unloader system is described which comprises a pallet having a plurality of grooves on its upper surface, a fork movable in the vertical direction and adapted to be received in the grooves of said pallet, a frame structure, and a truck movable along said frame structure and having a vertically movable loading platform on which said pallet can be placed, said component parts being operatively combined in such manner that one or more stacks of piled sheet bodies or other goods which are loaded on said pallet may be automatically unloaded either all together simultaneously or on a stack-by-stack basis.

1 Claim, 10 Drawing Figures 3,888,364

UNLOADER SYSTEM

BACKGROUND OF THE INVENTION

The present invention relates to a system for automatically unloading sheets from a pallet.

Heretofore, there has not been known an unloading system which is adapted to unload one or more stacks of sheet bodies piled up on a pallet without being tied and/or wrapped, while keeping the shape of the stacks, and the unloading has been carried out manually. Consequently, there were disadvantages that the working efficiency was low and that many workers were required.

SUMMARY OF THE INVENTION

Therefore, it is a primary object of the present invention to provide a novel unloading system which can obviate the above-referred disadvantages.

One feature of the present invention is the provision of an unloading system which comprises a pallet having a plurality of grooves on its upper surface, a fork movable in the vertical direction and adapted to be received in the grooves of said pallet, a frame structure, and a truck movable along said frame structure and having a vertically movable loading platform on which said pallet can be placed, said component parts being operatively combined in such manner that one or more stacks of piled sheet bodies or other goods which are loaded on said pallet may be automatically unloaded either all together simultaneously or on a stack-by-stack basis.

According to the present invention as featured above, sheet bodies piled on a pallet can be automatically unloaded by making use of a specially constructed pallet in combination, and further more by employing a truck having a vertically movable loading platform it is possible to unload a plurality of stacks of sheet bodies piled on the pallet either all together simultaneously or on a stack-by-stack basis. The unloading system is greatly advantageous not only upon application to an automatic sheet feeding system in a machine for manufacturing a box from corrugated cardboard as described later, but in general, upon application to the case of unloading stacks of wood sheets, iron sheets, plastics sheets, etc. piled up on a pallet either as a whole or on a stack-by-stack basis.

These and other objects, features and advantages of the invention will become apparent from the following explanation taken in conjunction with the drawings described in the following brief description.

DESCRIPTION OF THE PREFERRED EMBODIMENTS

Figure 3:
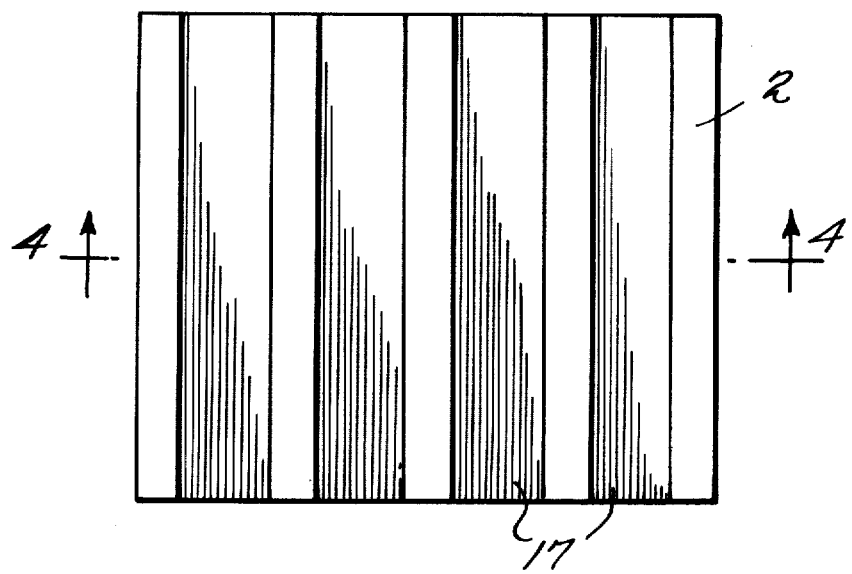
FIG. 3 is a plan view of a specially constructed pallet to be used in the unloading system according to the present invention.
Figure 4:
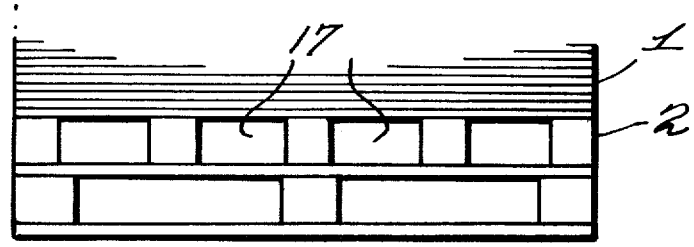
FIG. 4 is a cross-section view taken along line IV—IV in FIG. 3, and FIGS. 5 through 10 are schematic views illustrating the successive steps in the process of unloading two stacks of sheets piled on the pallet on a stack-by-stack basis.

At first, the construction of the unloading system according to the present invention will be described with reference to FIGS. 1 to 4. As shown in FIGS. 3 and 4, a pallet 2 to be used in the subject system is provided with a plurality (four in the illustrated embodiment) of grooves 17 on its upper surface, and each groove 17 of the pallet 2 has dimensions large enough to accomodate a respective prong of the fork 6. A frame structure 3 comprises horizontal frame members 18 and 19 extending along its left and right edges, and it has a sufficient mechanical strength for well withstanding the weight of the pallet 2 loaded with a stack or stacks of sheet bodies 1. On the frame structure 3 is provided a truck 4 which can travel forth and back with its own driving power along the frame members 18 and 19 which also serve as guide members for the truck 3, and a loading platform 5 of said self-travelling truck 3 is movable in the vertical direction to a predetermined extent. As best seen at *a* in FIG. 1, the upper surfaces of the frame members 18 and 19 of the frame structure 3 are notched to a predetermined depth for a sufficient length as fully described later at the end near to the fork 6. On a mounting beam 7 are mounted four prongs of the fork 6, which prongs are adapted to be inserted into the grooves 17 of the pallet 2 for unloading the stack of piled sheet bodies. Since said mounting beam 7 is provided with guide rollers that can slide along a vertical post having a U-shaped cross-section (not shown), the fork 6 can be moved vertically as guided by means of the guide rollers mounted on the mounting beam 7 and said vertical post. In addition, the mounting beam 7 is carried by a chain belt 10 engaged with upper and lower sprocket wheels 8 and 9 so as to be driven up and down, and the upper sprocket wheel 8 is in turn driven by a reduction motor 11 via another chain and sprocket assembly.

To a frame member 13 above the fork 6 are mounted a detector piece 14 for detecting the level of the top surface of the stack of sheet bodies and a pusher device 15 adapted to be driven back and forth by means of a cylinder or the like for assorting the piled sheet bodies 1 into an appropriate number of batches. In front of the unloading system is provided a belt conveyer 16 which serves to extract one batch of sheet bodies pushed out by said pusher device 15 and also to convey said batch to the next processing station. The means for assorting the sheet bodies into batches comprising the pusher device 15 and the belt conveyer 16 is described in detail and claimed in our copending U.S. patent application Ser. No. 374,067 filed June 27, 1973 claiming a Convention Priority based on Japanese patent application No. 75297/1973 filed July 27, 1972.

Figure 1:
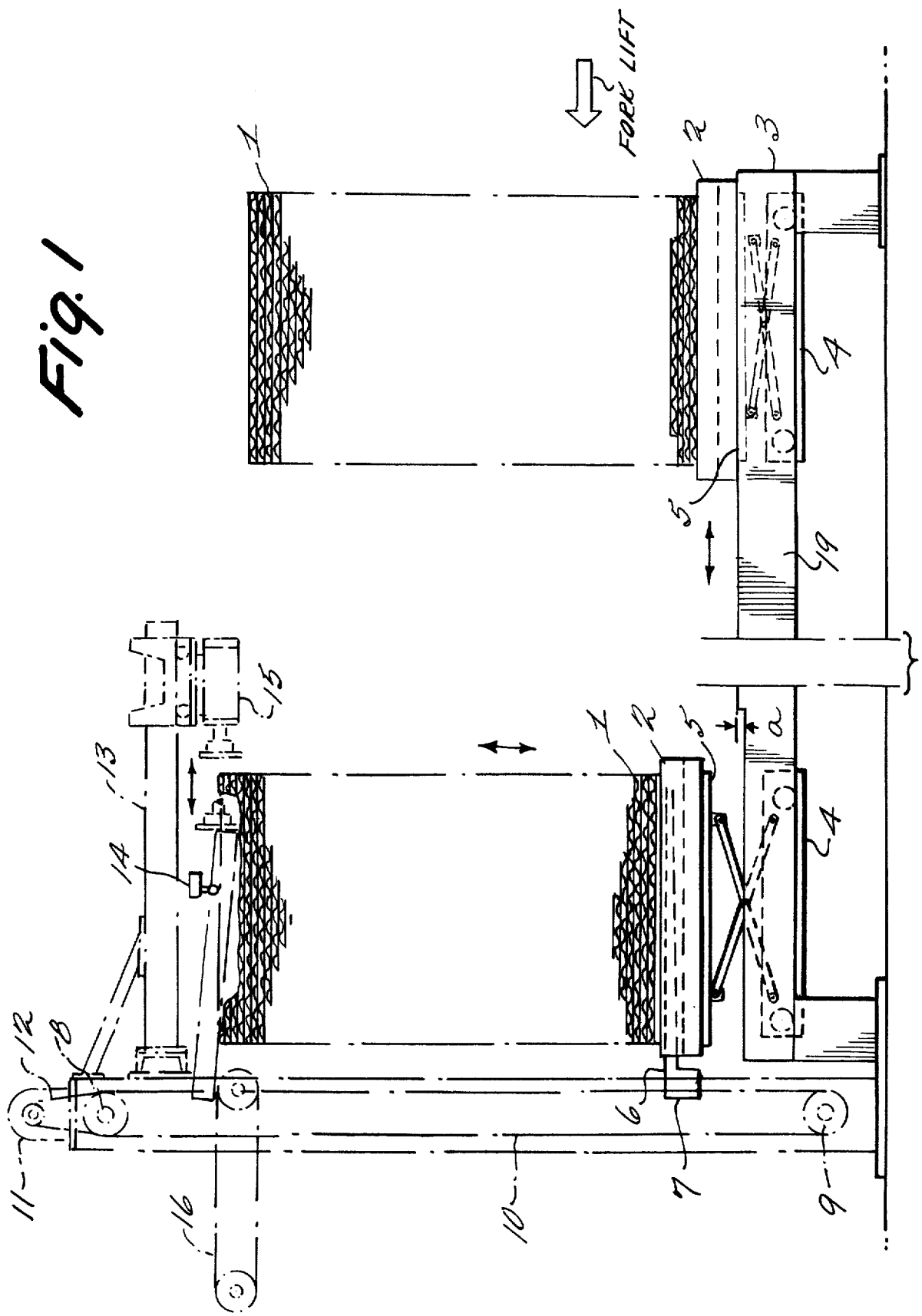
FIG. 1 is a general side view of an unloading system according to the present invention.
Figure 2:
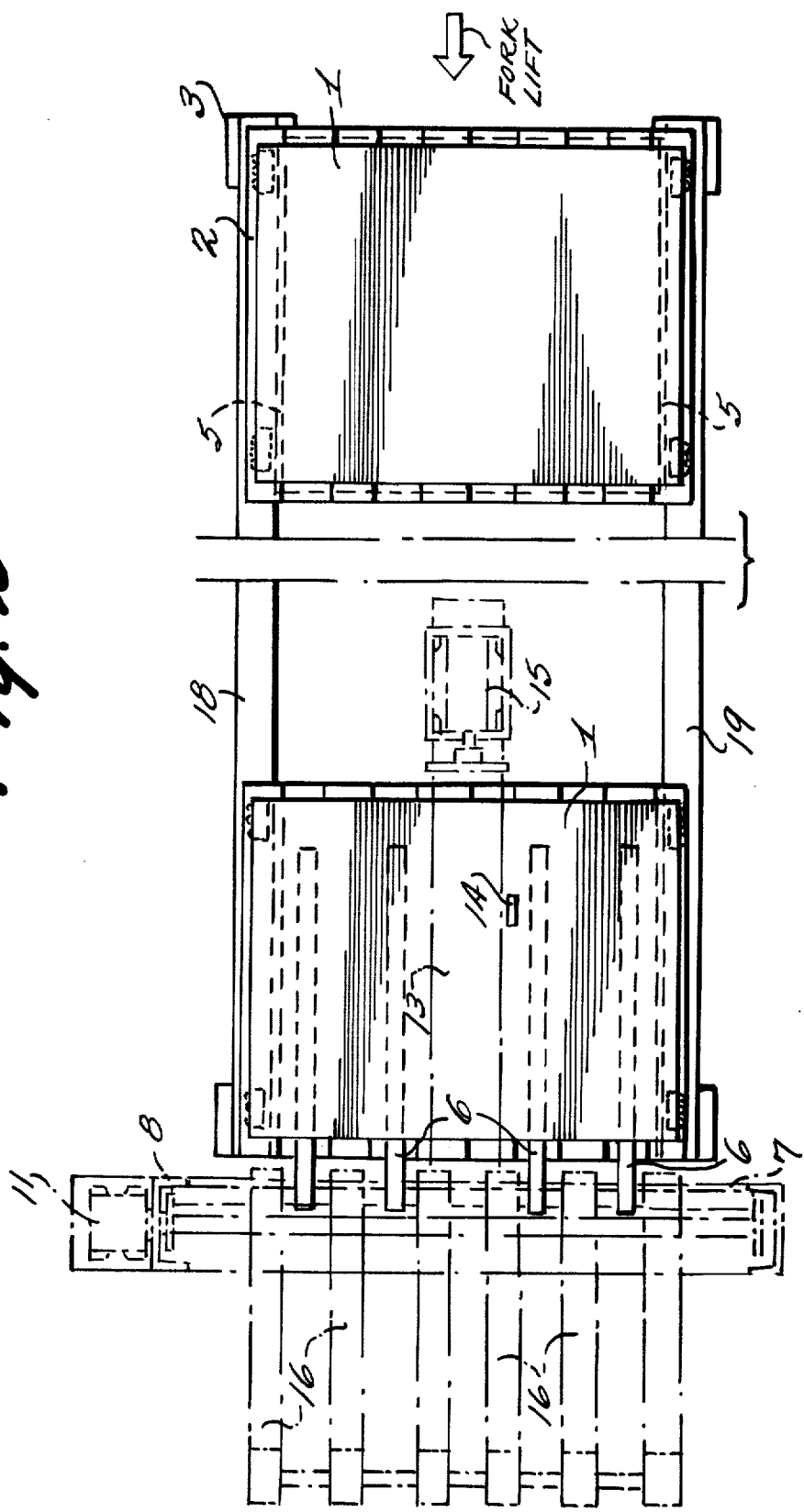
FIG. 2 is a plan view of the unloading system shown in FIG. 1.

Upon operation, at first, a pallet 2 having a number of grooves 17 on its upper surface and loaded with one or more stacks of piled sheet bodies 1, is placed on the frame structure 3 at its left and as viewed in FIG. 1 by means of a fork lift or the like. Nextly, the self-travelling truck 4 comes back with its loading platform 5 kept at the lowered position and stops just beneath the pallet 2. When the loading platform 5 of the self-travelling truck 4 is then raised while carrying the pallet 2 loaded with the stack of piled sheet bodies 1 until the pallet 2 leaves the frame structure 3, the self-travelling truck 4 advances while carrying the pallet 2 up to the position of the fork 6, where the truck 4 stops. In this case a proper relative position between the fork 6 and the pallet 2 has been established so that the prongs of the fork 6 may be inserted into the respective grooves of the pallet 2 without interference.

Now a description will be made on the method of unloading one or more stacks of sheet bodies 1 piled on the pallet 2 onto the fork 6 either all together simultaneously or on a stack-by-stack basis. Firstly, in case that one or more stacks of sheet bodies 1 are loaded on the pallet 2 and these stacks are to be unloaded simultaneously, if the loading platform 5 of the self-travelling truck 4 is lowered, then the pallet 2 is also lowered as carried by the loading platform with its upper surface left unloaded, while the stack of the piled sheet bodies 1 remains received by the fork 6, and thereby the unloading as a whole has been completed. In such an arrangement, generally the pallet 2 is received by the upper surface of the frame members 18 and 19 forming the frame structure 3 and kept at this position when the loading platform 5 of the self-travelling truck 4 has reached its lower end extremity. However, in the embodiment illustrated in FIGS. 1 and 2, since the upper surface of the frame members 18 and 19 of the frame structure 3 are partially notched, when the loading platform 5 is lowered at the position just above the notched portion near to the fork 6, the pallet 2 is kept carried by the loading platform 5 without being engaged with the frame structure 3.

Figure 5:
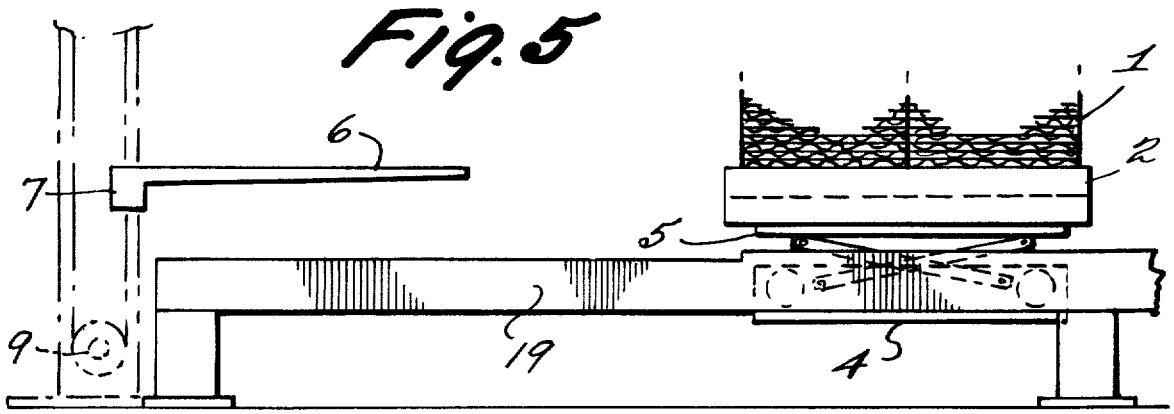
Figure 6:
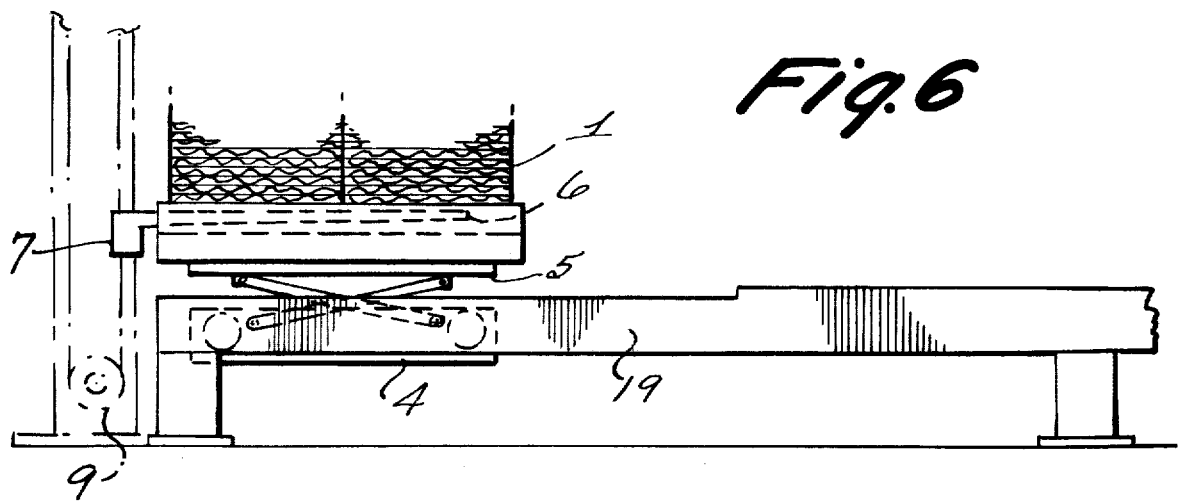
Figure 7:
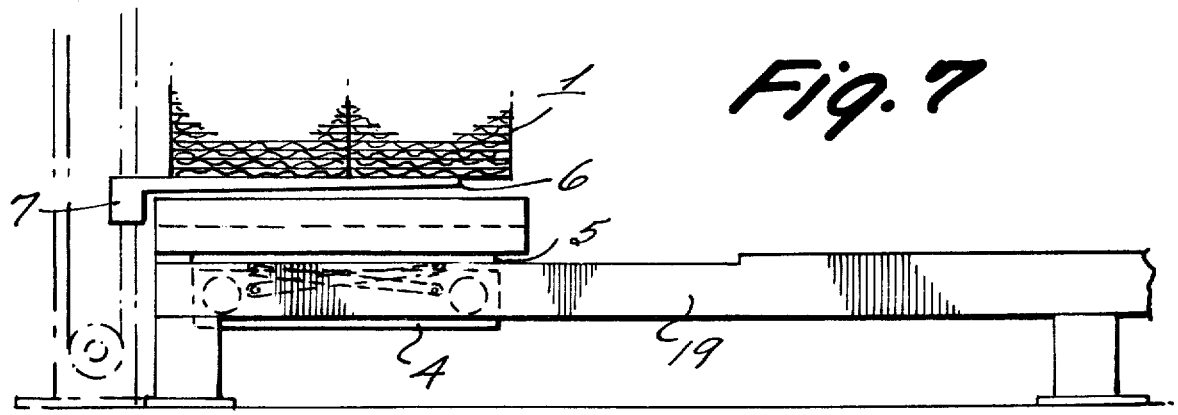
Figure 8:
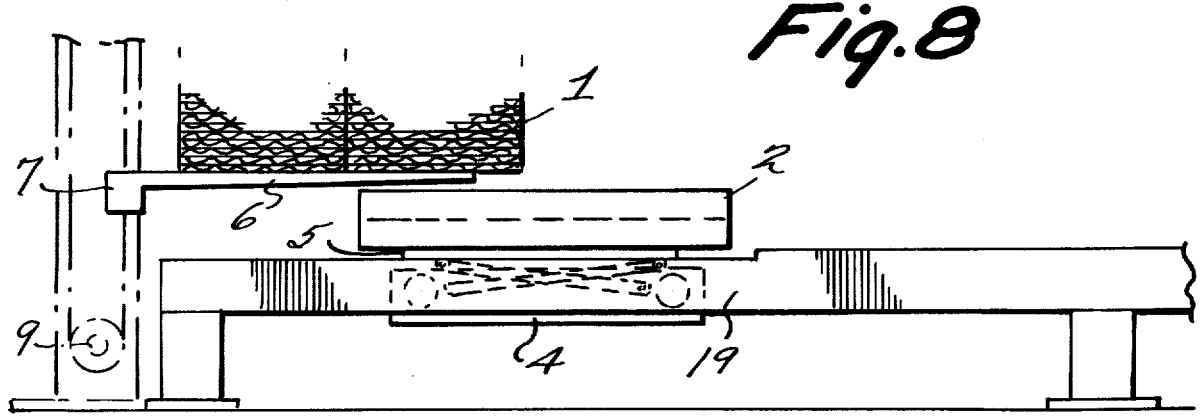
Figure 9:
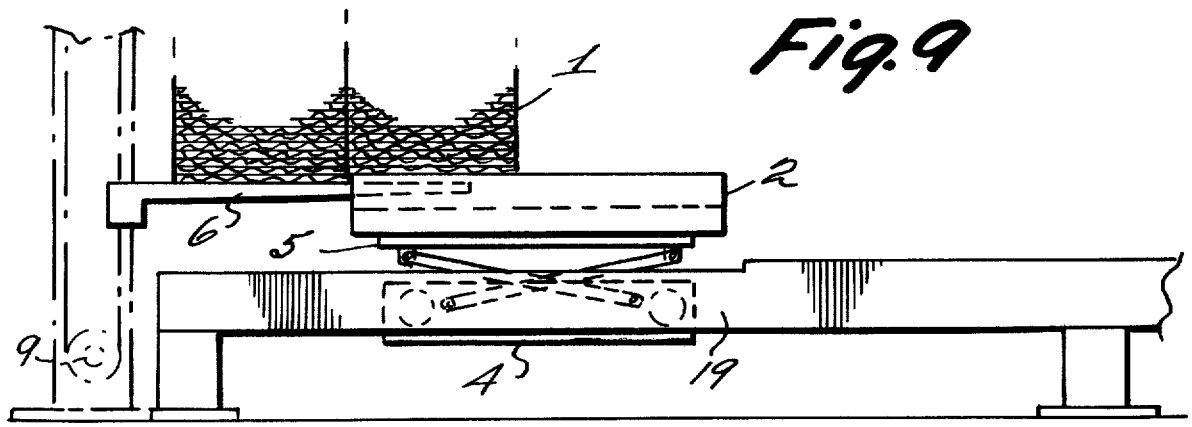
Figure 10:
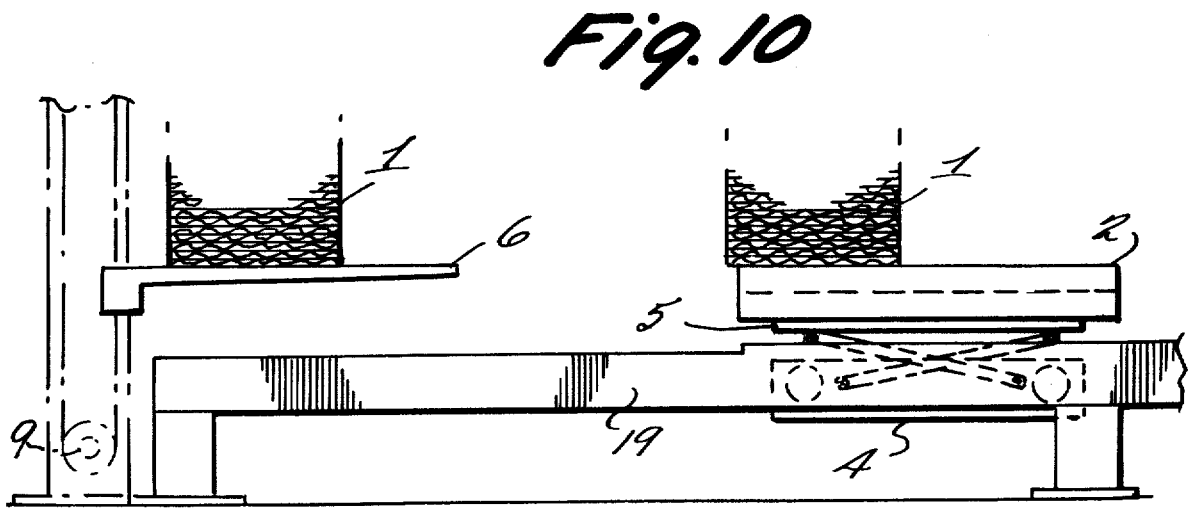

Nextly, the successive steps of operation upon unloading two stacks of sheet bodies 1 piled on the pallet 2 stack-by-stack by means of the fork 6 will be described with reference to FIGS. 5 through 10. The operation steps as schematically illustrated in FIGS. 5 to 7 are the same as the process of unloading as a whole described in the preceding paragraph. Therefore, no further description is added here with regard to these initial two steps. The difference in process upon unloading stack-by-stack exists in the additional steps as illustrated in FIGS. 8 to 10. However, it should be recalled that in the state where the loading platform 5 of the truck 4 has been lowered to its lowermost position as shown in FIG. 7, the pallet 2 is still carried by the loading platform 5 instead of lying on the frame structure 3 because of the provision of notches on the upper surfaces of the frame members 18 and 19.

Under such a condition, the self-travelling truck 4 is moved back with its loading platform 5 kept at the lowermost position and the unloaded pallet 2 placed thereon until it comes to the position where the front edge of the unloaded pallet 2 is slightly retracted from the front face of the second stack of piled sheet bodies as shown in FIG. 8, and the truck 4 stops there. At this position of the self-travelling truck 4, the loading platform 5 is again raised. Then the respective prongs of the fork 6 are received in the corresponding grooves 17 of the pallet 2, and so only the second stack of the piled sheet bodies 1 becomes loaded on the pallet 2 as shown in FIG. 9. When the self-travelling truck 4 has been moved back further while maintaining the loading platform 5 at its raised position, only one stack of piled sheet bodies remains loaded on the fork 6 as best seen in FIG. 10.

The stack of piled sheet bodies 1 thus loaded on the fork 6 is raised by means of the reduction motor 11 via the chain and sprocket assembly 12, sprocket wheels 8, 9, chain belt 10 and mounting beam 7, and when the top end of the stack has reached a predetermined level as detected by the detector piece 14, each group of an appropriate number of sheet bodies are pushed forward by the pusher device 15 which is in turn driven by a cylinder or the like so that said sheet bodies may be sorted into batches and conveyed to the succeeding processing station by means of a belt conveyer disposed in front of the unloading system. With regard to the more detailed operation of the assorting mechanism, reference should be made to the aforementioned copending U.S. patent application Ser. No. 374,067.

While we have not described the control circuit for achieving the above-described series of operations, it is a matter of course that these operations could be controlled in a fully automatic, semi-automatic or manual manner by making use of conventional electric control circuits.

As will be appreciated from the foregoing description, the present invention has resolved the difficulties in perfect automation of the automatic sheet feeding system in a machine for manufacturing a box, in that it was necessary to have a pallet conveyed to said machine with one or more stacks of piled corrugated cardboards loaded thereon at the preceding stage, and in that heretofore there has been not known an unloading system for automatically unloading the one or more stacks of piled sheet bodies loaded on the pallet. More particularly, according to the present invention, a fully automatic operation of said machine is enabled by making use of the subject unloading system consisting of a specially constructed pallet, a fork, and a truck having a vertically movable loading platform, and consequently, saving of labor is achieved and a high speed operation also becomes possible. Especially, owing to the fact that the configuration of the frame structure has been partly modified, it has become possible to unload the goods loaded on a pallet through a simple action of vertically moving the loading platform of a self-travelling truck, and also it has become possible to unload a plurality of stacks of goods on a stack-by-stack basis. These are very advantageous in the art.

What is claimed is:

1. An unloading system for stacked sheets, comprising:
    a frame structure including horizontal frame means having upwardly presented support surface means which is presented at a higher level along a first portion of the length of the support surface means and which steps down to a lower level along a second, longitudinally adjacent portion of the length of the support surface means,
    a travelling truck mounted on the frame structure for forth and back movement along the horizontal frame means;
    a platform;
    means mounting the platform on the travelling truck for movement therewith along the frame structure, said mounting means mounting the platform for vertical movement between an upper level wherein the platform lies above the upwardly presented support surface means of the horizontal frame means of both said first and second portions of the support surface means and a second, lower level wherein the platform lies below the higher level of support surface means, but above the lower level of the support surface means;

a pallet for support at least two longitudinally side-by-side vertical stacks of horizontal sheets, means defining a plurality of laterally spaced, longitudinally extending upwardly opening grooves in the pallet;

a lifting fork having a plurality of generally horizontal, laterally spaced, longitudinally extending prongs;

means mounting the lifting fork overlying one end of the second portion of the support surface means, away from the first portion of the support surface means;

the pallet being sized to be carried on said platform and said grooves being sized to be entered by respective ones of said lifting fork prongs, whereby, the pallet, with at least two side-by-side stacks of sheets thereon, may be loaded onto the higher level of the support surface, the travelling truck positioned therebeneath with the platform lowered to the lower level thereof, then raised to lift the pallet and stack clear of the support surface, whereupon the travelling truck may be moved along the frame structure with the level of the lifting fork relative to the level of the platform adjusted so that the prongs enter the grooves of the pallet, so that both stacks may be transferred from the pallet to the lifting fork, whereupon the platform may be lowered to the lower position thereof, with the pallet remaining thereon, the travelling truck may be moved back so that only the foremost stack no longer overlies the pallet, whereupon the level of the lifting fork relative to the platform may be changed to cause the remaining stack to be again supported on the pallet on the platform on the travelling truck and thus the remaining stack may be moved back out of the way of the lifting fork for placement on the lifting fork after the foremost stack has been consumed;

sensing means positioned with vertical spacing over the lifting fork for sensing when the lifting fork is raised to such an extent that the top of the stack supported on the lifting fork is disposed at a predetermined level;

a conveyor positioned beside the lifting fork adjacent said predetermined level; and pusher means mounted and positioned intermittantly to engage a predetermined number of sheets at once and to push them laterally from the top of the stack supported on the lifting fork when the top of that stack is at said predetermined level, and onto said conveyor.

* * * * *